United States Patent Office 2,773,952
Patented Dec. 11, 1956

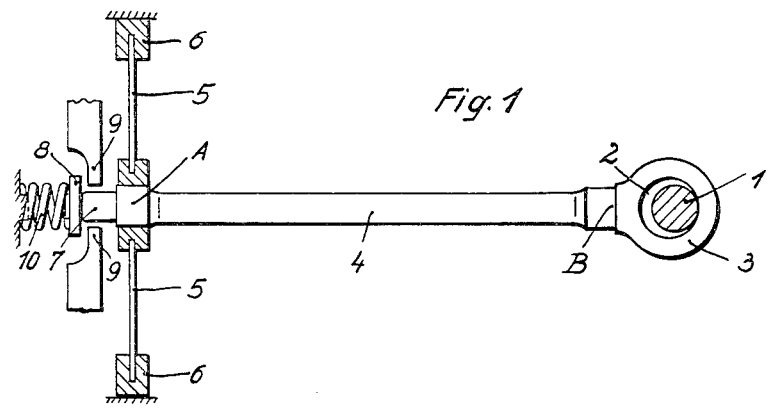
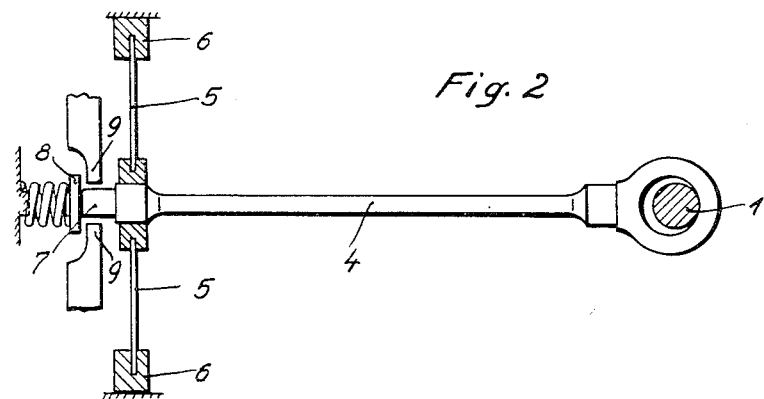
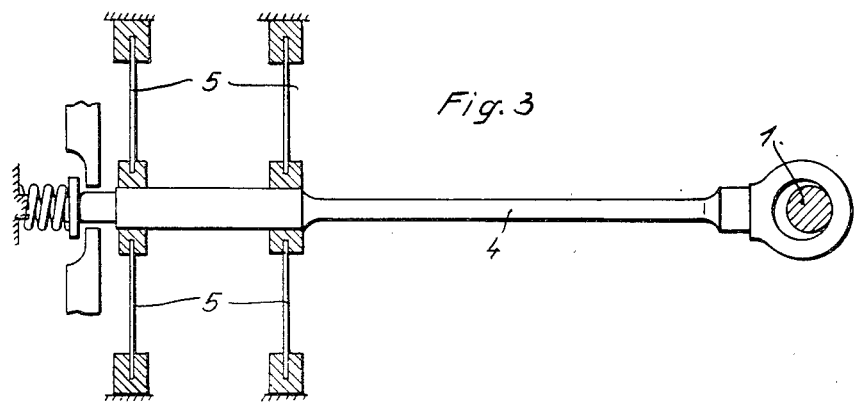

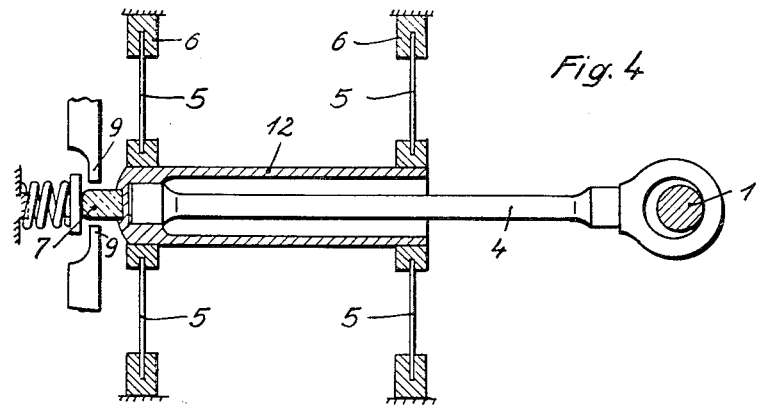
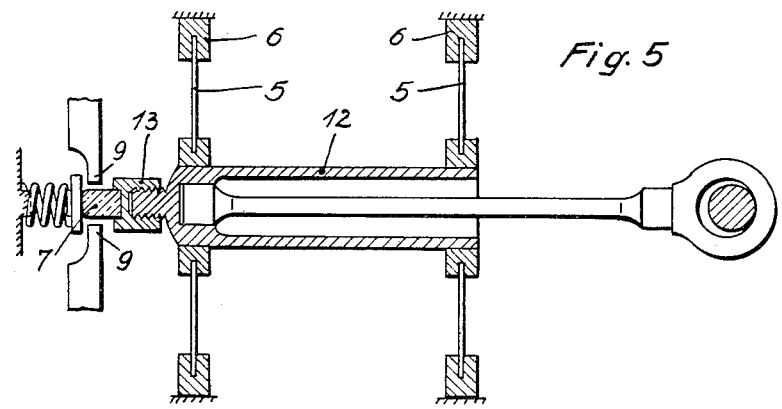
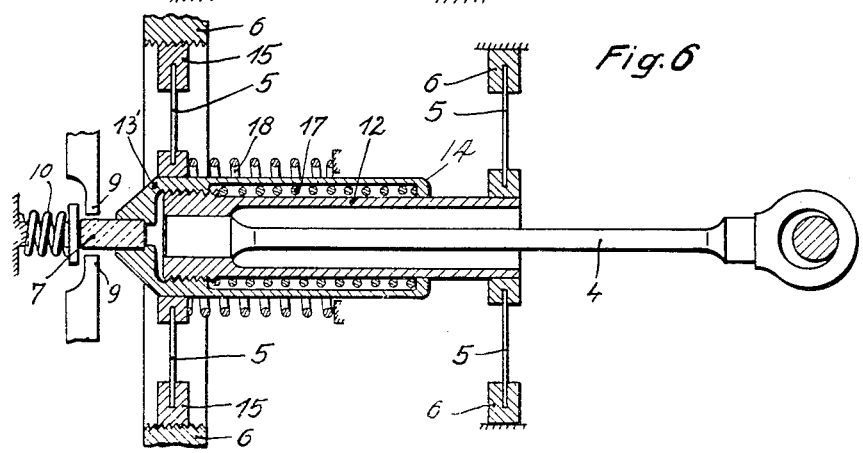

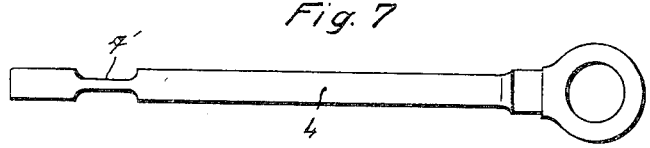
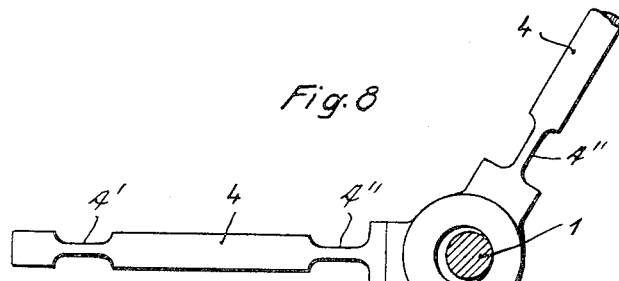
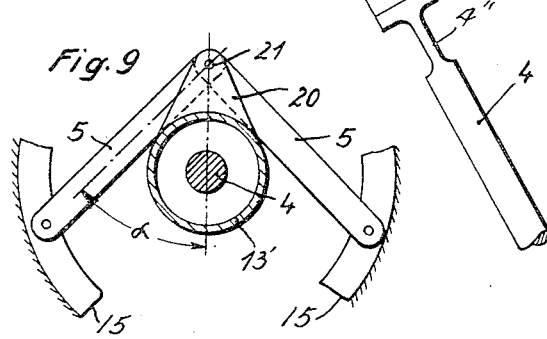
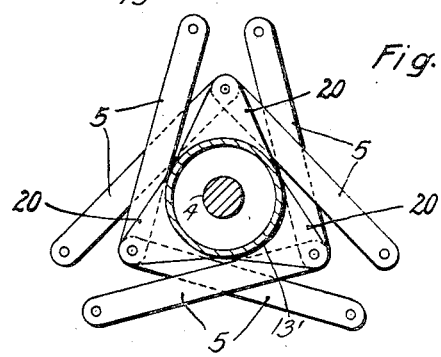

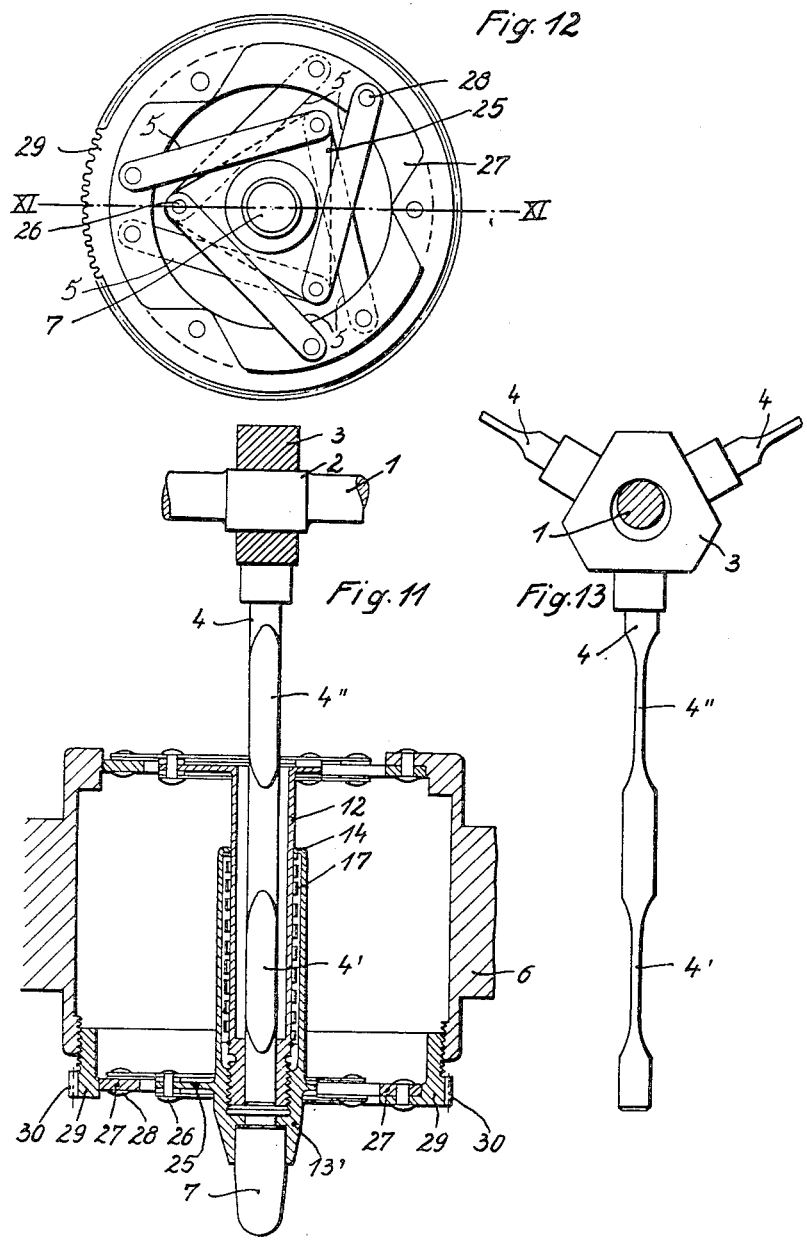

2,773,952

MECHANICALLY DRIVEN ELECTRIC CONTACT RECTIFIER

Paul Duffing, Berlin-Siemensstadt, Germany, assignor to Siemens-Schuckertwerke Aktiengesellschaft, Berlin-Siemensstadt, Germany, a corporation of Germany Application April 23, 1953, Serial No. 350,617

Claims priority, application Germany April 29, 1952

14 Claims. (Cl. 200—30)

My invention relates to electric contact converters in which a contact device, connected in an alternating-current circuit or in each phase of a polyphase circuit, is periodically opened and closed by a mechanical drive in synchronism with the alternating current and in such a phase relation thereto that only current half-waves of one polarity can pass through the contact device.

The known contact converters of the mechanically driven type have each contact operated by a tappet driven from a motor through an eccentric bearing on a camshaft or crankshaft. To translate the revolutions of the shaft into the reciprocating tappet motion, the tappet may be linearly guided in a slide bearing and may be pressed against the eccentric bearing by a spring. During the shaft revolution, the center point of the eccentric bearing moves on a circle about the shaft axis, thus periodically advancing the tappet against the spring. During this operation, a slight relative motion takes place between the eccentric bearing and the tappet at a variable speed of periodically reversing direction. Such relative movements of alternating directions also occur between the tappet and the parallel-motion guide. If, instead of an eccentric cam a crank is used for driving the tappet, similar relative movements occur in the crank bearing. If an eccentric cam drive is used in conjunction with a slide piece to which the tappet is attached, a relative movement in alternating directions takes place between the slide piece and eccentric bearing. All these slide faces must be lubricated. It is difficult, however, to maintain an oil film sufficient for satisfactory lubrication when the sliding velocity changes its direction, especially when this change occurs as rapidly as is necessary in contact converters for power currents of the customary 50 C. P. S. or 60 C. P. S. frequencies. For that reason, the known contact converters of the mechanically driven type are provided with special accessories such as a pressure lubrication system.

It is an object of my invention to obviate such lubricating difficulties by eliminating all sliding engagements of a variable direction of relative movement and to retain only those slide bearings whose relative movements occur at a uniform velocity such as at the sliding engagement between the cam or crank and the pertaining eccentric bearing.

To this end, and in accordance with my invention, I connect the tappet structure of the converter contact device at one end firmly with the eccentric bearing of the drive and support the other end of the tappet structure on one or more elastically deflective members.

The elastically deflective supporting members may consist of simple straps or bands, for instance leaf springs of steel, bronze or aluminum. According to a preferred feature of the invention, a plurality of such elastic members are connected to respective different points on the periphery of the tappet structure so that none of the members is subjected in the longitudinal tappet axis to a pressure load sufficient to cause excessive bending or folding of the straps. Due to the attachment of the tappet structure to the elastic members, the point of the tappet axis in the plane of the elastic members is constrained to linear reciprocating motion similar to that of the center point of a diaphragm.

According to another feature of the invention, the tappet itself may be designed as an elastically deflectable member so that the guiding straps need not alone perform the entire translation of the rotating movement into the linear tappet reciprocation.

According to still another feature, the tappet structure is spring supported in the above-described manner at two places spaced from each other along the tappet axis so that not only one point but the entire active end of the tappet assembly is constrained to a linear motion. This requires that the portion of the tappet between the eccentric bearing and the closest point of elastic support be designed as an elastically deflectable part.

In cases where the tappet is designed as an elastically deflectable part, its strength must be such that it cannot fold or bend excessively during the transmission of pressure forces.

To reduce or eliminate the contact pressure acting upon the tappet structure, the structure may be equipped with a compression or tension spring which partially or fully equalizes the contact pressure.

According to another feature of the invention, the tappet structure is composed of an elastically deflectable rod and a tube, the tube being connected with the rod end remote from the drive shaft and being mounted on both ends on elastically deflectable suspension members. In such an apparatus, the contact end of the tappet structure performs an accurately linear reciprocation at a minimum of overall length of the tappet assembly.

These and other objects, advantages and features of my invention will be apparent from, or will be referred to in, the following description of the electric contact rectifiers according to the invention shown on the drawing, in which—

Figs. 1 to 6 are part-sectional views of six different converter mechanisms respectively, all views being in the axial direction of the drive shaft;

Fig. 7 shows a modified tappet rod applicable in any of the mechanisms illustrated in the other figures;

Fig. 8 is a partial axial view of a triple converter mechanism equipped with tappet rods according to another modification;

Figs. 9 and 10 are partial axial views of two further embodiments; and

Figs. 11, 12 and 13 show still another embodiment, Fig. 12 being an axial view from the bottom, Fig. 11 a vertical section along the plane XI—XI in Fig. 12, and Fig. 13 a view of a detail of the tappet rods.

The same reference numerals are used in the various figures for denoting similar elements respectively.

According to Fig. 1 a shaft 1, driven from a motor (not illustrated) in synchronism with an alternating current to be rectified, carries an eccentric cam 2 firmly joined with the shaft and engaged by an eccentric bearing 3. While the eccentric bearing is shown as a slide bearing, it should be understood that an antifriction bearing, such as a ball bearing, may be provided between the cam and the bearing structure. A tappet rod 4 is firmly connected with the eccentric bearing 3. The end of the tappet remote from shaft 1 is secured to elastically deflective straps or leaf springs 5. It is preferable to provide a plurality of such bands and to join them with the tappet at respective points that are preferably uniformly distributed over the tappet periphery. In the illustrated example, two straps 5 are connected with the tappet at diametrically opposite points.

The apparatus has a stationary housing or frame structure 6 into which the outer ends of the straps 5 are inserted. A tappet head 7 of insulating material is connected with the tappet rod 4 and actuates a contact bridge 8 cooperating with two stationary contact pieces 9. The contact bridge 8 is subjected to the force of a spring 10 which provides the necessary contact pressure. The rod 4 and the head 7 form together a rigid tappet structure.

When the cam shaft 1 is revolving, the eccentric bearing 3 moves on a circular path but does not effect a revolutionary movement, while the slide face of the eccentric cam 2 performs a uniform rotational movement. When providing a ball bearing, the inner race revolves about its axis at uniform speed, while the outer race travels on a circular path but does not revolve.

Due to the elastic suspension, point A of the tappet structure reciprocates on a straight line, all points of the tappet structure between points A and B move on an elliptic path, while the movement of point B is substantially circular.

If the rod 4 itself is designed as an elastically deflective member so that it may somewhat bend transverse to its longitudinal axis, the stresses imposed upon straps 5 are reduced because the translation of the shaft revolution into the reciprocating motion of the active end of the tappet assembly is then conjointly effected by the axially deflective operation of the straps and the lateral deflection of the tappet rod. For this purpose, the tappet rod 4 may be given a reduced cross section between points A and B as is illustrated in Fig. 2.

To secure an accurately linear movement of the active tappet end, it is especially favorable to mount the tappet on two sets of elastically deflective members at two axially spaced places as exemplified by the embodiment shown in Fig. 3. With such a tappet suspension, all parts between the two suspension points move linearly. It is then necessary to design the tappet rod 4 between the eccentric bearing and the adjacent suspension point as an elastically deflective part as is also shown in Fig. 3.

To reduce the space requirements in the axial tappet direction while nevertheless securing an accurate parallel guidance of the active tappet end, the rod 4 may be designed as an elastically deflective part and may be attached near its active end to a tube mounted on elastically deflective members at two axially spaced points. This is illustrated in Fig. 4. The rod 4, in comparison with that of Fig. 1, has a reduced cross section to permit deflective movements transverse to the tappet axis. The left end of the rod is inserted into a rigid tube 12 which carries the tappet head 7 and is secured at its two ends to respective sets of leaf-spring straps 5 as described in the foregoing. The tube 12 with the tappet head 7 and the adjacent end of rod 4 performs an accurately linear movement. The tappet structure in this embodiment comprises the rod 4, the tube 12 and the tappet head 7.

It is in many cases desirable to provide for a variation in the effective length of the tappet structure for equalizing inaccuracies of manufacture or for varying the contact closing periods. This can be achieved in apparatus according to the invention by screwing onto the active end of the tappet a part which actuates the contact. The effective length of the tappet structure as a whole can then be varied by turning the part. An embodiment incorporating the just-mentioned feature is shown in Fig. 5. The tubular part 12 of the tappet structure has an axial threaded part which carries a nut 13 joined with the tappet head 7. Turning the nut 13 causes the tappet structure to vary its overall axial length. In all other respects, the embodiment is similar to that of Fig. 4.

To render any play in the screw thread between the threaded part and the rest of the tappet structure ineffective, and in accordance with another feature of my invention, the threaded part of the tappet head is shaped as a tube which has one end secured to a set of elastically deflectable members, while the other end abuts slidably against the inner tube with as little clearance as possible so that the axis of the outer tube is always coincident with that of the inner tube. To neutralize any axial play between the two tubes, a spring may be placed between the two tubes to act in the axial direction with a force larger than the alternating forces transmitted by the tappet structure.

When providing an exterior tube, the arrangement may be such that the effective length of the tappet can be changed during the operation of the apparatus. To this end, according to another feature of my invention, the elastically deflectable members connected with the outer tube are rotatably mounted in a stationary housing or support, for instance, with the aid of a screw thread. It is then possible to change the tappet length during the operation by turning the deflective supporting assembly relative to the housing or frame structure of the apparatus.

The converter illustrated in Fig. 6 exemplifies the just-mentioned features. The screw-threaded part carrying the tappet head 7 consists of a tubular body 13′ which is seated upon the inner tube 12 with as little clearance as possible. To this end, the tube 13′ has an inwardly projecting shoulder 14 slidably but firmly seated on the inner tube 12. Near its tappet-head end, the outer tube 13′ is attached to elastically deflective members 5. The inner tube 12 has its shaft-side end attached to another set of elastically deflective members 5. The rod 4 is designed as an elastically deflective part. The outer tube 13′ and the tappet head 7 in this embodiment perform an accurately linear reciprocating movement. If the part 15, in which the spring straps 5 for the outer tube 13′ are mounted, is made rotatable within the housing 6, for instance, by providing a screw thread at the junction, then the active length of the tappet assembly can be varied by turning the part 15. This change in tappet length is due to the fact that a rotary movement of part 15 relative to housing 6 produces a relative movement between the outer tube 13′ and the inner tube 12, thus changing the overall length of the tappet structure comprising the rod 4, the inner tube 12, the outer tube 13′ and the tappet head 7. It is of advantage to give both screw threads, namely the one of housing 6 and the one between the inner and outer tubes, the same pitch.

To render any axial play in the threaded engagement between the inner and outer tubes ineffective, the converter of Fig. 6 is equipped with a spring 17 abutting at one end against the inner tube 12 and at the other end against a shoulder 14 of the outer tube 13′. Spring 17 is so stiff that the outer tube 13′ is always forced axially against the screw thread of the inner tube. To reduce the danger of rod 4 becoming excessively deflected or folded, another spring 18 is provided abutting with one end against the rigid housing structure of the apparatus, and with its other end against a shoulder face of a part rigidly joined with the outer tube 13′. Spring 18 produces a force which fully or partly counterbalances the contact pressure imposed upon the tappet assembly by the contact spring 10. As a result, the tappet rod is partly or fully stressed under tension. Instead of a compression spring, a tensional spring may be provided for this purpose.

In order to make the tappet rod 4 laterally deflective without danger of folding, the reduction in cross section may be provided, not along the entire length of the rod, but only near one or both rod ends leaving the rest of the rod unweakened and rigid. Fig. 7 shows such a rod with a reduced cross section only at 4′ near one of the rod ends.

If several tappets are driven from the same eccentric bearing as exemplified by the embodiment of Fig. 8, then a reduction in cross section must be provided at both rod ends, such as at 4′ and 4″, to secure the desired elastic deflection.

The spring members supporting and guiding the tappet structure are preferably made as long as feasible. To save space, these members may be connected at such points of the tappet structure that each member intersects at an acute angle the straight line between its point of attachment and the tappet axis. While this intersection angle, theoretically, may be zero, it will generally be made larger than zero for reasons of design. Such an apparatus is schematically illustrated in Fig. 9.

The outer tube 13' has a lateral projection 20. The elastically deflective members 5 are connected with the projection 20 and are so directed that the angle α between the elastic member and the straight line connecting its point of attachment 21 with the tappet axis has an acute magnitude. In all other respects, the converter is similar to that of Fig. 6.

As mentioned, it is preferable to have several deflective suspension members connected with respectively different peripheral points of the tappet assembly. Such an apparatus, otherwise also similar to that of Fig. 6, is shown in Fig. 10. The tube 13' has three radial projections 20. Two spring straps 5 are connected with the end of each of the respective projections 20. The other ends of the six straps 5 are secured to the stationary housing structure or may be rotatable as a whole relative to that structure as explained above with reference to Fig. 6.

Further design details of a converter according to the invention are apparent from the converter shown in Figs. 11, 12 and 13. Joined with the eccentric bearing 3 on cam 2 of shaft 1 are three tappet rods 4 displaced 120° from each other (Fig. 13). Each rod 4 has two constricted portions near its respective ends. The rod end remote from the shaft is firmly connected with an inner tube 12. Tube 12 has a threaded portion engaged by a correspondingly threaded portion of an outer tube 13' which carries the tappet head 7. A helical compression spring 17 is disposed in the annular space between the two tubes and abuts at one end against the inner tube and at the other end against a shoulder 14 of the outer tube, thus eliminating the axial play of the threaded engagement. Displacements of the tube axes relative to each other are prevented by the shoulder 14 which slidably contacts the inner tube without clearance. A triangular plate 25 is connected or integral with the outer tube 13' (Fig. 11). Two elastic members 5 are attached to each of the three respective corner points of the triangular plate, one of the two members being located on one axial side of the plate and the other member on the other side. The other ends of the six elastic members 5 are secured to a ring 27 by rivets 28. Ring 27 is mounted on projections of another ring 29. Ring 29 has a peripheral thread with which it is screwed into the stationary housing or frame structure 6 of the apparatus and has gear teeth 30 on its periphery. The gear teeth are engageable with a pinion (not illustrated) which, when operated, turns the ring 29 relative to the housing 6. This causes the outer tube to rotate about the inner tube, thus changing the length of the tappet structure comprising the rod 4, the inner and outer tubes 12, 13' and the tappet head 7. The spring mounting of the inner tube 12 near its end facing the camshaft is similar to that of the outer tube, except that the outer ends of the pertaining spring straps 5 are firmly connected with the stationary housing or frame structure 6.

The apparatus, as well as those according to all other embodiments, completely avoids any bearings subjected to sliding velocities of alternating direction.

It will be obvious to those skilled in the art upon a study of this disclosure that apparatus according to my invention may be modified and embodied in various ways and may be incorporated in designs other than those specifically illustrated and described, without departing from the essential features of my invention and within the scope of the claims annexed hereto.

I claim:

1. A contact converter, comprising a contact device having a reciprocable contact, a reciprocable tappet structure engageable with said contact, a revolvable drive shaft having an eccentric cam, a drive bearing cooperatively secured on said cam, said tappet structure having one end firmly connected with said bearing, elastic support means deflectable in the axis of tappet motion and connected with said tappet structure near the other end of said structure, said tappet structure being elastically deflective transverse to said axis.

2. A contact converter, comprising a contact device having a reciprocable contact, a bendable elongated reciprocable tappet structure engageable with said contact, a revolvable drive shaft having an eccentric cam, a drive bearing cooperatively mounted for rotating motion on said cam, said tappet structure having one end firmly connected with said bearing, and two sets of elastic support means deflective in the axial tappet direction and connected with said tappet structure near the other end of said structure and at a point spaced from said other end, whereby said tappet structure is elastically deflected transverse to its longitudinal axis during its reciprocation.

3. A contact converter, comprising a contact device having a reciprocable contact, a reciprocable tappet structure engageable with said contact and having a tappet rod elastically deflective transverse to the tappet stroke and tubular means connected with said rod at the rod end away from said shaft, a revolvable drive shaft and an eccentric cam, a bearing cooperatively secured on said cam, said rod having the other end firmly connected with said bearing, and two sets of elastic support means deflective in the axial tappet direction and connected with said tubular means at axially spaced points thereof.

4. A contact converter according to claim 3, comprising a tappet head adjacent to said contact and having a threaded part, said tubular means having a coaxial part in threaded engagement with said part of said head.

5. A contact converter, comprising a contact device having a reciprocable contact, a reciprocable tappet structure engageable with said contact along part of the tappet stroke, said tappet structure having a tappet rod elastically deflective transversely to the tappet stroke and having two tubes concentrically surrounding said rod, the inner one of said tubes being firmly connected with said rod at one end thereof, a revolvable drive shaft and an eccentric bearing on said shaft, said rod having the other end firmly connected with said bearing, said two tubes having respective screw threads engaging each other and located near said one rod end, said tappet structure having a tappet head to engage said contact, said tappet head being mounted on said outer tube, and two sets of elastic support means deflective in the tappet-stroke direction and spaced from each other in said direction, one of said sets being connected with said inner tube near the tube end facing said bearing, and the other set being connected with said outer tube at the tube end near said tappet head.

6. A contact converter according to claim 5, comprising a frame structure on which said two sets of elastic supporting means are mounted, a part rotatably mounted on said frame structure in coaxial relation to said tubes, said one set of elastic support means being attached to said frame structure, and said other set being attached to said rotatable part.

7. A contact converter according to claim 5, comprising a frame structure on which said two sets of elastic supporting means are mounted, a part of annular shape concentric to said tubes and having a coaxial screw thread engaging said frame structure, said one set of elastic support means being attached to said frame structure, and said other set being attached to said annular part so that rotary movement of said part relative to said frame structure is transmitted by said other set to said outer tube.

8. In a contact converter according to claim 5, said two tubes forming together a cylindrical interstice, a spring disposed in said interstice and engaging said respective two tubes at axially spaced points to exert axial force upon the threaded engagement of said two tubes.

9. A contact converter, comprising a contact device having a reciprocable contact, a reciprocable tappet structure engageable with said contact, a revolvable drive shaft having an eccentric drive bearing, said tappet structure having one end firmly connected with said bearing, elastic support means deflectable in the axis of tappet motion and connected with said tappet structure near the other end of said structure, said tappet structure comprising a tappet rod rigid over most of its length and having a portion of reduced cross section near the rod end away from said bearing so as to be elastically deflective transversely to the tappet stroke.

10. In a contact converter according to claim 1, said tappet structure comprising a tappet rod rigid along its middle portion and having two elastic portions of reduced cross section near the two rod ends respectively.

11. In a contact converter according to claim 5, each of said two tubes having radial projections evenly distributed over the periphery, and each of said two sets of elastic support means comprising pairs of elongated spring members, the two members of each pair having a common point of connection to one of said respective projections and extending at an acute angle and in symmetrical relation to the shaft radius of said point.

12. A contact converter for opening and closing an alternating-current circuit in synchronism with the current, comprising a stationary structure, a contact device having a contact reciprocable relative to said structure, an elongated tappet reciprocable relative to said structure and engageable with said contact along part of the tappet stroke, a revolvable drive shaft having an eccentric cam, a drive bearing cooperatively secured on said cam, said tappet having one end firmly connected with said bearing, elastic support means mounted on said structure and deflectable along the axis of tappet motion and connected with said tappet near the other end of said tappet, a contact pressure spring disposed between said stationary structure and said contact and having a spring force opposing the opening movement of said contact, and a spring disposed between said structure and said tappet and having a spring force in opposition to said contact pressure spring.

13. A contact converter for opening and closing an alternating-current circuit in synchronism with the current, comprising a contact device having a reciprocable contact, an elongated reciprocable tappet structure engageable with said contact along part of the tappet stroke, a revolvable drive shaft having an eccentric cam, a drive bearing cooperatively secured on said cam, said tappet structure having one end firmly connected with said bearing, elastic support means deflectable along the axis of tappet motion, means interconnecting said elastic support means with said tappet structure near the other end of said structure, said elastic support means comprising an annular support structure surrounding said tappet structure and a plurality of elongated spring members interconnecting said annular support structure and said elastic support interconnecting means, the longitudinal axis of each of said spring members defining an acute angle with the perpendicular from the tappet structure to the point at which said respective spring member is connected with said elastic support interconnecting means.

14. A contact converter for opening and closing an alternating-current circuit in synchronism with the current, comprising a contact device having a reciprocable contact, an elongated reciprocable tappet structure engageable with said contact along part of the tappet stroke, a revolvable drive shaft having an eccentric cam, a drive bearing cooperatively secured on said cam, said tappet structure having one end firmly connected with said bearing, and elastic support means deflectable along the axis of tappet motion, means interconnecting said elastic support means with said tappet structure near the other end of said structure, said elastic support means comprising an annular support structure surrounding said tappet structure and a plurality of pairs of elongated spring members interconnecting said annular support structure and said elastic support interconnecting means, the two members of each pair having a common point of connection to said elastic support interconnecting means and each member defining an acute angle with the perpendicular from said tappet structure to said point of connection, said two members being mutually symmetrically spaced with respect to said tappet structure.

References Cited in the file of this patent

UNITED STATES PATENTS

| | | |
|---|---|---|
| 2,246,922 | Macchioni | June 24, 1941 |
| 2,651,750 | Koppelman | Sept. 8, 1953 |